United States Patent [19]

Tansei et al.

[11] 4,398,584
[45] Aug. 16, 1983

[54] PNEUMATIC RADIAL TIRES FOR HEAVY VEHICLES

[75] Inventors: Hikaru Tansei, Higashimurayama; Kenichi Motomura, Kodaira, both of Japan

[73] Assignee: Bridgestone Tire Company Limited, Tokyo, Japan

[21] Appl. No.: 216,699

[22] Filed: Dec. 15, 1980

[30] Foreign Application Priority Data

Dec. 24, 1979 [JP] Japan .............. 54-167863

[51] Int. Cl.³ .............................. B60C 15/00
[52] U.S. Cl. .................. 152/362 CS; 192/354 R; 192/356 R; 192/359
[58] Field of Search ......... 152/362 CS, 354 R, 356 R, 152/359, 355, 354 RB, 362 R, 356 A, 357 R

[56] References Cited

U.S. PATENT DOCUMENTS

| | | | |
|---|---|---|---|
| 3,638,705 | 2/1972 | Devienne | 152/362 R X |
| 3,841,377 | 10/1974 | Montagne | 152/362 CS |
| 4,215,737 | 8/1980 | Motomura et al. | 152/362 CS X |
| 4,265,292 | 5/1981 | Inoue | 152/362 CS X |

*Primary Examiner*—William A. Powell
*Assistant Examiner*—Thomas Bokan
*Attorney, Agent, or Firm*—Sughrue, Mion, Zinn, Macpeak and Seas

[57] ABSTRACT

A pneumatic radial tire for heavy vehicles is disclosed. This tire comprises a carcass composed of at least one ply of cords arranged in a substantially radial plane inclusive of the rotary axis of the tire with a turnup portion thereof, and a plurality of reinforcing layers for bead portion each containing cords crossed with the cords of the carcass ply. Among these reinforcing layers, reinforcing layers having heights which are different in radially upward end as measured from a reference line parallel to the rotary axis of the tire passing through the center of a bead core toward the radial direction of the tire and having cords with substantially the same modulus of elasticity are crossed with each other such that the cords of the reinforcing layer are inclined at a larger angle with respect to the radial plane of the tire as the height of the radially upward end becomes lower.

12 Claims, 4 Drawing Figures

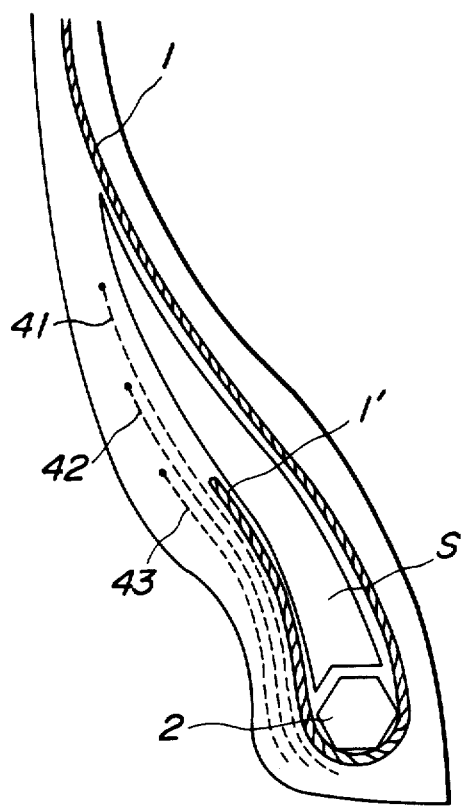
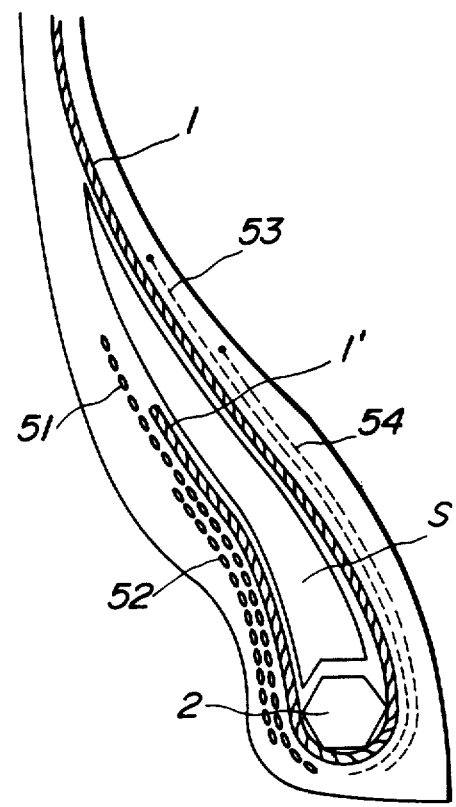

PNEUMATIC RADIAL TIRES FOR HEAVY VEHICLES

BACKGROUND OF THE INVENTION

This invention relates to pneumatic tires, and more particularly to an improvement of a bead portion in pneumatic radial tires for heavy vehicles.

In general, a tire of this type comprises as shown in FIG. 1 a carcass 1 of one ply alone or possibly two or more plies arranged in a substantially radial direction of the tire and is provided with a rubber stock S disposed above a bead core 2 between the carcass 1 and the turnup portion 1' thereof. The stock S is a substantially triangular section, and a reinforcing layer 31 is arranged outside the turnup portion 1' of the carcass 1 and composed of metal cords each beingcrossed at a relatively large angle (about 60°) with respect to the radial direction of the tire. Two reinforcing layers 32, 33 are arranged outside the reinforcing layer 31, each composed of organic fiber cords crossed at a relatively large angle (about 60°) with respect to the radial direction of the tire because the rigidity of the bead portion is fairly small when compared with the case of bias tires. However, the tire of this structure satisfies the requirement of rim chafing resistance to a certain extent, but does not always satisfy the requirement of durability of the bead portion because of peeling off of each reinforcing layer 31, 32, 33 at upward end thereof (hereinafter referred to as separation) is apt to be caused due to the stress concentration during the rotation of the tire under a load.

It is, therefore, an object of the invention to propose developmental results on the reinforcing structure of the bead portion, in which the separation of the bead portion is effectively prevented without lowering the rimchafing resistance and hence the durability of the bead portion is considerably improved by investigating the appropriate arrangement and construction of the above mentioned reinforcing layers in the bead portion.

The inventors have made detailed studies and found out that the object of the invention can advantageously be achieved by the following construction.

That is, according to the invention there is provided a pneumatic radial tire for heavy vehicles comprising a carcass composed of at least one ply of cords, each being arranged in a radial plane inclusive of the rotary axis of the tire or inclined at an extremely small angle with respect to the radial plane. The carcass ply is wound around a bead core from the inside toward the outside thereof to form a turnup portion to sandwich a rubber stock disosed on the bead core, and a plurality of reinforcing layers for bead portion each containing cords crossed with the cords of the carcass ply. The improvement comprises that the reinforcing layers have heights which are different in the upward end as measured from a reference line parallel to the rotary axis of the tire passing through the center of the bead core toward the radial direction of the tire and have cords with substantially the same modulus of elasticity that are crossed with each other such that the cords of the reinforcing layers are inclined at a larger angle with respect to the radial plane of the tire as the height of the radially upward end becomes lower.

BRIEF DESCRIPTION OF THE DRAWING

The invention will now be described in detail with reference to the accompanying drawings, wherein:

FIGS. 3 and 4 are partially sectional views of embodiments of the pneumatic radial tire for heavy vehicles according to the invention, respectively.

DETAILED DESCRIPTION

According to the invention, at least one ply of metal cords or plural plies of organic fiber cords may optionally be selected and used as the carcass. As regards the reinforcing layer used for the reinforcement of the bead portion along the turnup portion of the carcass, it may be considered to take the following embodiments:

1. The reinforcing layer is a metal cord layer and/or an organic fiber cord layer;
2. The reinforcing layer is arranged outside the bead core with respect to the axial direction of the tire; and
3. At least a part of the reinforcing layers is arranged inside the bead core and along the carcass with respect to the axial direction of the tire.

Figure 2:
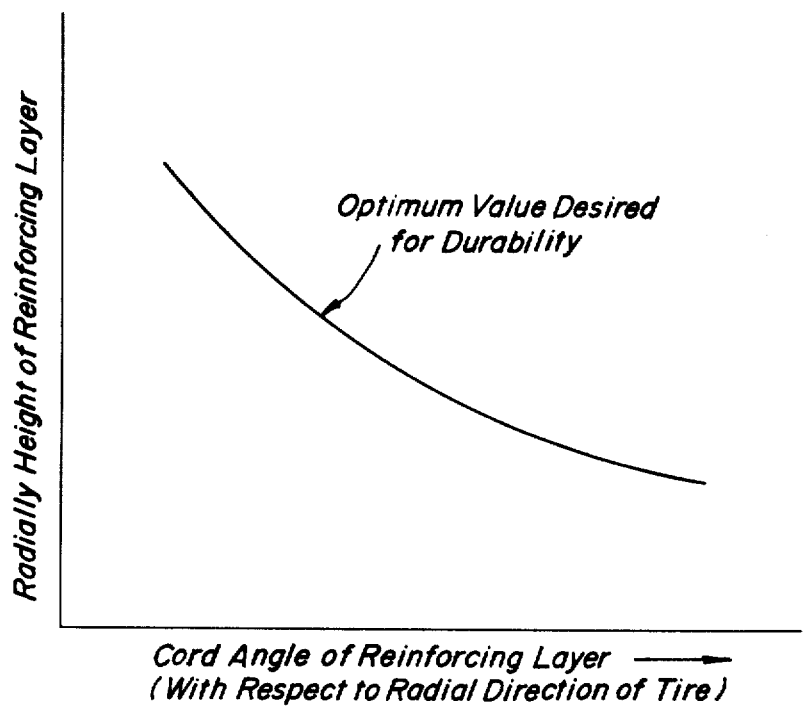
FIG. 2 is a graph showing a relationship between the height of radially upward end and cord angle in the reinforcing layer exerting upon the durability of the bead portion.

In any case, it has been found out as shown in FIG. 2 that in order to prevent the separation of the reinforcing layer, it is desirable to lower the height of radially upward end in the reinforcing layer when cords of such reinforcing layer are inclined at a larger angle with respect to the radial plane of the tire. While, when the cord angle is small, there are no problems even if the height of radially upward end is fairly high. Thus, the invention can synergistically enhanceboth radial and circumferential reinforcing effects without separation by an advantageous combination of at least two reinforcing layers having different cord arrangements, i.e. the radial reinforcing effect is realized by a relatively small cord angle with respect to the radial direction and at the same time the circumferential reinforcing effect is realized by a relatively large cord angle with respect to the radial direction.

According to the invention, radially upward ends of the reinforcing layers cause a step difference to each other, whereby the radial stress concentration in each reinforcing layer is avoided during the rotation of the tire under a load. Therefore, it is practically desirable that such a step difference is at least 5 mm, preferably not less than 10 mm. For convenience' sake, the height of radially upward end inclusive of the step difference means a vertical size as measured from a reference line parallel to the rotary axis of the tire passing through the center of the bead core.

In the above step difference, it is preferable that a difference of cord angle between the adjoining reinforcing layers is at least 10°.

Figure 1:
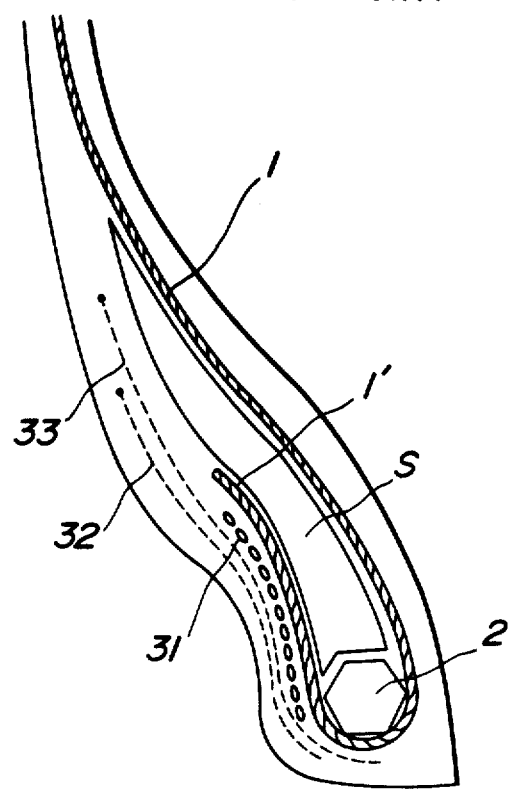
FIG. 1 is a partially sectional view illustrating a reinforcement of a bead portion in the conventional heavy duty pneumatic radial tires as mentioned above.

FIG. 3 shows first embodiment of the pneumatic radial tire for heavy vehicles according to the invention. This tire comprises a carcass 1 composed of one ply of steel cords, each cord being arranged in a radial direction of the tire. The carcass 1 is wound around a bead core 2 from the inside toward the outside thereof to form a turnup portion 1' of the carcass to sandwich a rubber stock S disposed on the bead core 2 at substantially the same position as shown in FIG. 1. In the illustrated embodiment, a tread reinforcement usually composed of plural layers of metal cords and superimposed about a crown of the carcass 1 or a so-called belt is omitted.

The tire illustrated in FIG. 3 has a tire size of 10.00R20 14PR and is provided with three reinforcing layers 41, 42 and 43, each containing nylon cords therein and being arranged outside the bead core 2 along the turnup portion 1' of the carcass 1 with respect to the axial direction of the tire. In the case, the reinforcing layer 41 is highest in the height of upward end and has a cord angle of 30° with respect to the radial plane, the reinforcing layer 42 is middle in the height and has a cord angle of 55°, the reinforcing layer 43 is lowest in the height and has a cord angle of 80°, and the cords of these three reinforcing layers are crossed with each other with respect to the radial plane. Further, the step difference between the adjacent radially upward ends of reinforcing layers is 20 mm.

As previously mentioned, it is obvious that the important feature of the invention is a relationship between the height of upward end and the cord angle in each of the reinforcing layers. In addition, as shown in FIG. 3, it is preferable to lower the height of the radially upward end outwardly toward the axial direction of the tire in view of the durability of the radially upper end portion of the reinforcing layer.

The effect of the invention will be described with reference to the comparison test of the tire shown in FIG. 3 with the conventional tire having the same tire size as shown in FIG. 1.

In this test, the tire to be tested is run on a drum at a speed of 80 km/hr under normal internal pressure and normal load, during which the bead durability (running distance until the bead portion is damaged) and rim chafing resistance are measured to obtain results as shown in the following Table 1, wherein both the performances are expressed by an index on the basis that the conventional tire of FIG. 1 is 100.

TABLE 1

| | Conventional tire (FIG. 1) | Tire according to the invention (FIG. 3) |
| --- | --- | --- |
| Bead durability | 100 | 120 |
| Rim chafing resistance | 100 | 100 |

In FIG. 4 is shown another embodiment of the pneumatic radial tire for heavy vehicles according to the invention, wherein the fundamental structure of the bead portion comprising the carcass 1 with the turnup portion 1' thereof, bead core 2 and rubber stock S is the same as shown in FIG. 3.

In the illustrated embodiment, the tire has also a tire size of 10.00R20 14PR and is provided with two reinforcing layers 51 and 52, each containing steel cords therein and being arranged outside the bead core 2 along the turnup portion 1' of the carcass 1 with respect to the axial direction of the tire, and two other reinforcing layers 53 and 54, each containing nylon cords therein and being arranged inside the bead core 2 along the carcass 1 with respect to the axial direction of the tire. In this case, the reinforcing layer 51 is highest in height of upward end andhas a cord angle of 30° with respect to the radial plane, the reinforcing layer 52 is lowest in height and has a cord angle of 70°, and the cords of these two reinforcing layers are crossed with each other with respect to the radial plane and further the step difference between the adjacent upper ends of the reinforcing layers 51, 52 is 30 mm, while the reinforcing layer 53 is highest in height of upward end and has a cord angle of 30° with respect to the radial plane, the reinforcing layer 54 is lowest in height and has a cord angle of 55°, and the cords of these two reinforcing layers are crossed with each other with respect to the radial plane and further the step difference between the adjacent upper ends of the reinforcing layers 53, 54 is 20 mm.

In this embodiment, the relationship between the height of radially upward end and the cord angle in each of these reinforcing layers also becomes important. In view of the durability at the upper end portions of the reinforcing layers, it is preferable that the height of upward end in the reinforcing layers 51, 52 is made lower toward the outside with respect to the axial direction like the case of the previous embodiment, while when the reinforcing layers are arranged inside the carcass 1 with respect to the axial direction, the height of upward end in the reinforcing layers 53, 54 is made lower toward the inside with respect to the axial direction.

In the above embodiments, a nylon cord layer alone or the combination of nylon cord layer and steel cord layer is used as the reinforcing layer for bead portion when the carcass is composed of one ply of steel cords and these reinforcing cords mean typical examples of metal cords and organic fiber cords. Therefore, even when the carcass is composed of organic fiber cords or particularly metal cords and the reinforcing layers are metal cord layers or the combination of metal cord layers and organic fiber cord layers, if two or more reinforcing layers having preferably the same modulus of elasticity satisfy the relationship between the height and cord angle in each of the reinforcing layers as defined above, substantially the same effect as mentioned in the above embodiments can be expected.

According to the invention, the separation of the reinforcing layer is prevented and particularly the bead durability can considerably be improved without lowering the rim chafing resistance by the appropriate arrangement and construction of the reinforcing layers in the bead portion.

What is claimed is:

1. In a pneumatic radial tire for heavy vehicles comprising a carcass composed of at least one ply of cords, each being arranged in a radial plane inclusive of the rotary axis of the tire or inclined at an extremely small angle with respect to the radial plane, the carcass being wound around a bead core from the inside toward the outside thereof to form a turnup portion to sandwich a rubber stock disposed on the bead core, the improvement comprising; a bead portion reinforcement containing at least two metal cord layers each arranged toward the outside of the bead core and containing cords crossed with the cords of the carcass ply, said metal cord layers having different heights in their upward ends as measured from a reference line parallel to the rotary axis of the tire passing through the center of the bead core toward the radial direction of the tire and having cords with substantially the same modulus of elasticity, the height of the upward ends of cords of said metal cord layers lowering outwardly toward the axial direction of the tire and, the cords of said metal cord layers crossed with each other such that the cords of each of the metal cord layers are inclined at a larger angle with respect to the radial plane of the tire as the heights of the upward ends decrease.

2. A pneumatic radial tire as claimed in claim 1, wherein said bead portion reinforcement further contains at least two cord layers each arranged toward the inside of the bead core along the carcass with respect to the axial direction of the tire, and said cord layers having heights which are different in their upward ends and have cords with substantially the same modulus of elasticity.

3. A pneumatic radial tire as claimed in claim 2, wherein the cords of said cord layers are crossed with each other such that the cords of each of said cord layers are inclined at a larger angle with respect to the radial plane of the tire as the height of the upward end decreases.

4. A pneumatic radial tire as claimed in claim 2, wherein the height of the upward end of said cord layers is lower inwardly toward the axial direction of the tire.

5. A pneumatic radial tire as claimed in claim 1 or 2, wherein a step difference between the upward ends of the adjoining two layers is at least 10 mm.

6. A pneumatic radial tire as claimed in claim 1 or 2, wherein a difference of cord angle between the adjoining two layers is at least 10°.

7. In a pneumatic radial tire for heavy vehicles comprising a carcass composed of at least one ply of cords, each being arranged in a radial plane inclusive of the rotary axis of the tire or inclined at an extremely small angle with respect to the radial plane, the carcass being wound around a bead cord from the inside toward the outside thereof to form a turnup portion to sandwich a rubber stock disposed on the bead core, the improvement comprising; a bead portion reinforcement containing at least three organic fiber cord layers each arranged toward the outside of the bead core and containing cords crossed with the cords of the carcass ply, said organic fiber cord layers having different heights in their upward ends as measured from a reference line parallel to the rotary axis of the tire passing through the center of the bead core toward the radial direction of the tire and having cords with substantially the same modulus of elasticity, the height of the upward ends of cords of said organic fiber cord layers lowering outwardly toward the axis direction of the tire and, the cords of said organic fiber cord layer, crossed with each other such that the cords of each of the organic fiber cord layers are inclined at a larger angle with respect to the radial plane of the tire as the heights of the upward ends decrease.

8. A pneumatic radial tire as claimed in claim 7, wherein said bead portion reinforcement further contains at least two cord layers each arranged toward the inside of the bead core along the carcass with respect to the axial direction of the tire, and said cord layers having heights which are different in their upward ends and have cords with substantially the same modulus of elasticity.

9. A pneumatic radial tire as claimed in claim 8, wherein the cords of said cord layers are crossed with each other such that the cords of each of the cord layers are inclined at a larger angle with respect to the radial plane of the tire as the height of the upward end decreases.

10. A pneumatic radial tire as claimed in claim 8, wherein the height of the upward ends of said two cord layers is lower inwardly toward the axial direction of the tire.

11. A pneumatic radial tire as claimed in claim 7 or 8, wherein a step difference between the upward ends of the adjoining two layers is at least 10 mm.

12. A pneumtic radial tire as claimed in claim 7 or 8, wherein a difference of cord angle between the adjoining two layers is at least 10°.

* * * * *